United States Patent [19]

Fisher

[11] Patent Number: 4,639,963
[45] Date of Patent: Feb. 3, 1987

[54] SHOE MANUFACTURING SYSTEM

[75] Inventor: Lee K. Fisher, Birmingham, Mich.

[73] Assignee: Cargill Detroit Corporation, Clawson, Mich.

[21] Appl. No.: 616,849

[22] Filed: Jun. 4, 1984

[51] Int. Cl.⁴ .................. A43D 3/00; A43D 25/00
[52] U.S. Cl. ................................. 12/1 A; 12/1 W
[58] Field of Search .......... 12/1 R, 1 A, 1 F, 1 W, 12/142 T, 70; 69/6.5

[56] References Cited

U.S. PATENT DOCUMENTS

| | | | |
|---|---|---|---|
| 2,051,374 | 8/1936 | Frost | 12/1 A |
| 3,077,098 | 2/1963 | Pearsall et al. | 12/1 A |
| 3,077,619 | 2/1963 | Hidden et al. | 12/1 A |
| 3,161,898 | 12/1964 | Bromfield et al. | 12/1 A |
| 3,784,995 | 1/1974 | Egtvedt et al. | 12/1 A |
| 3,828,384 | 8/1974 | Bechtold | 12/1 A |
| 4,090,378 | 5/1978 | Sommer | 69/6.5 |
| 4,181,994 | 1/1980 | Gruber | 12/1 A |

FOREIGN PATENT DOCUMENTS

| | | | |
|---|---|---|---|
| 842170 | 6/1952 | Fed. Rep. of Germany | 12/1 R |
| 855371 | 11/1952 | Fed. Rep. of Germany | 12/1 R |
| 2529763 | 1/1984 | France | 12/1 A |

Primary Examiner—Henry S. Jaudon
Assistant Examiner—Steven N. Meyers
Attorney, Agent, or Firm—Lloyd M. Forster

[57] ABSTRACT

Shoe manufacturing system to rough and cement lasted uppers and outsoles including subsequent operations to load shank and bottom filler, dry, spot and sole lay, scour, and ink "cement construction" shoes. The system combines non-synchronous carrousel transport with roughing and cement application stations where preprogrammed selective shoe model and size numerically controlled roughing and cementing application operations are performed.

16 Claims, 7 Drawing Figures

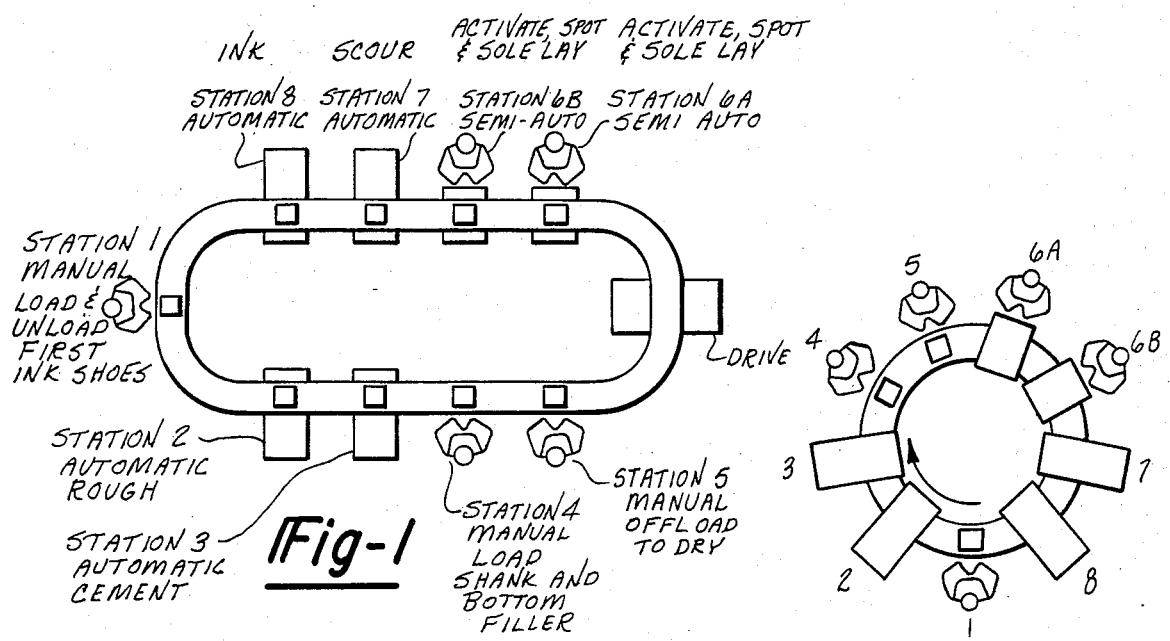
Fig-1
Fig-1A
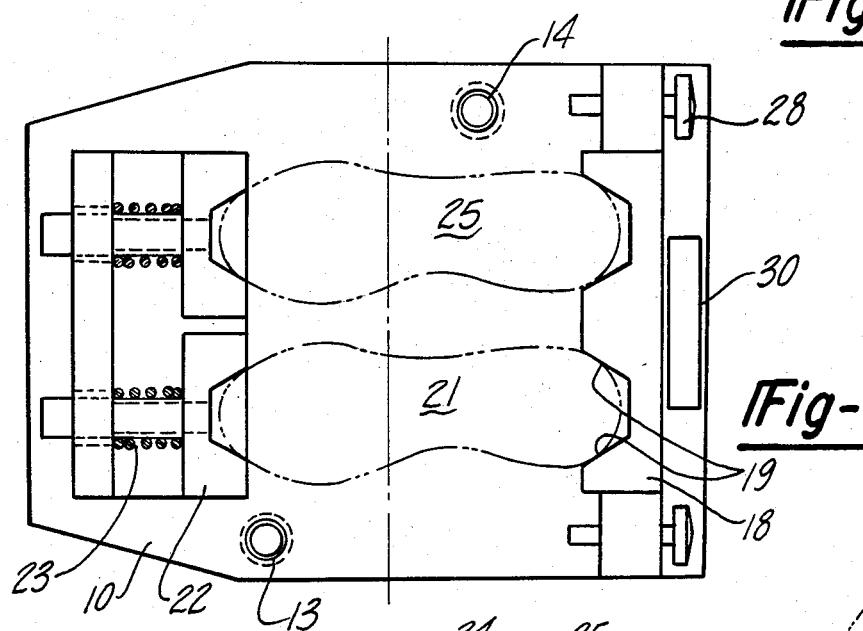
Fig-2
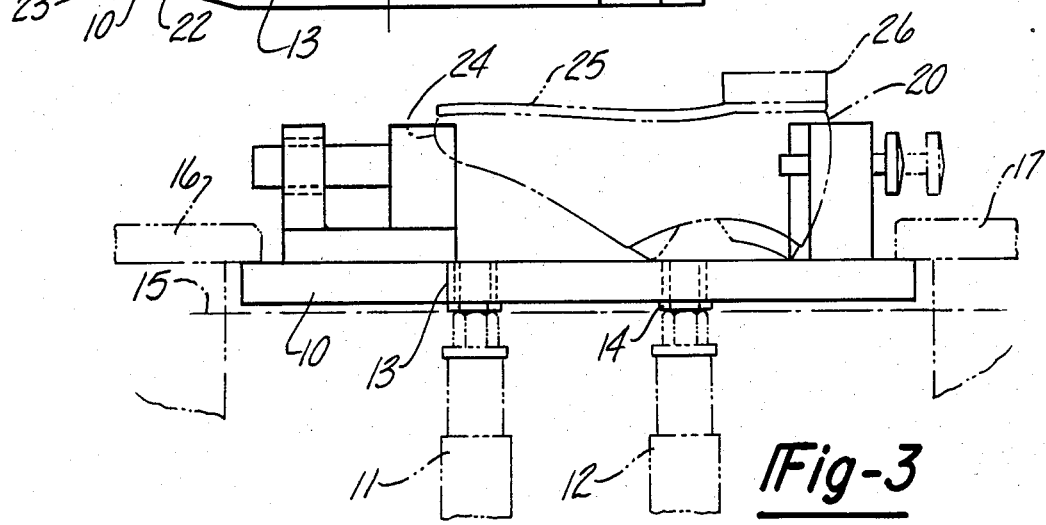
Fig-3

SHOE MANUFACTURING SYSTEM

BACKGROUND OF THE INVENTION

Conventional sequential outsole cementing assembly systems employ indexing or continuously moving conveyors wherein lasted shoe uppers are taken off line for processing at individual machines. Roughing to prepare the upper shoe material for cemented adherence is conventionally a skilled manual operation where a rotary wire roughing brush is guided by hand around the perimeter of an inverted lasted upper in the area where cement is to be applied. Automatic roughing has been developed wherein the side margin of the lasted upper is employed by a roughing tool follower to establish a roughing path with predetermined margin relative to the side perimeter and with resilient bias means for accommodating different shoe sizes. The closest prior art found in a recent search includes the following issued patents: U.S. Pat. Nos. 1,975,034; 3,077,619; 3,334,367; 3,538,526; 3,638,261; 3,784,995; 3,828,384; 3,858,263; 4,181,994; 4,304,020.

BRIEF SUMMARY OF THE INVENTION

The present invention employs a non-synchronized pallet conveyor serving spaced automatic and manual stations. Each automatic station has pallet stopping, accurate locating and clamping means. Pallets are equipped with universal fixtures adapted to accurately position and retain an inverted lasted shoe upper, together with an opposite outsole to be cemented, of any shoe size and style within the range for which the system is constructed. The mating shoe upper and opposite outsole may be carried on a following pallet; or as an alternative, may be mounted on a common double size pallet.

At automatic stations each pallet upon engaging a stop is automatically accurately located and clamped for the duration of the operation and thereupon released for reengagement of conveyor drive to the next station. A sequence of stations in a typical installation includes a manual load and unload station followed by seven sequential stations for automatic rough; automatic cement; manual load shank and bottom filler; manual offload to dry and reload; two duplicate semi-automatic stations for activate spot and sole lay; automatic scour; and automatic ink; hereupon returning the pallet to the first load and unload station.

BRIEF DESCRIPTION OF THE DRAWINGS

FIG. 1 is a schematic plan view of a nine station, non-synchronous carrousel system;

FIG. 1a is a plan view of a similar non-synchronous system in a circular form layout accommodating ring transport;

FIG. 2 is a plan view of the pallet adapted to transport an inverted lasted shoe upper and opposite sole;

FIG. 3 is a side elevation of the pallet shown in FIG. 2;

With reference to FIG. 1 the carrousel system employs a continuously running pivoted link conveyor having upper horizontal plates adapted to frictionally engage and transport pallets in non-synchronous sequence from station to station where engageable stops arrest the drive and, in case of automatic stations, locating pins accurately position and clamp pallets by means hereinafter described.

With reference to FIG. 1A the same sequence of stations is arranged along a circular path wherein the pallets may be transported by a continuously rotating circular ring conveyor of the type disclosed in co-pending application Ser. No. 06/198,525.

With reference to FIGS. 2, 3 and 4, typical pallets include base plate 10 adapted to rest on and frictionally engage the conveyor chain, in the case of FIG. 1 carrousel system, or the drive ring in the case of FIG. 1A non-synchronous system, for transport between stations where a retractable stop is employed to interrupt drive and locating pins 11 and 12 are employed to engage bushings 13 and 14 in pallet plate 10 and raise the pallet off surface 15 of the conveyor chain in the case of FIG. 1 or drive ring in the case of FIG. 1A and upwardly into clamping engagement with clamp rails 16 and 17 laterally spaced along the path of the conveyor at the automatic stations.

Figure 4:
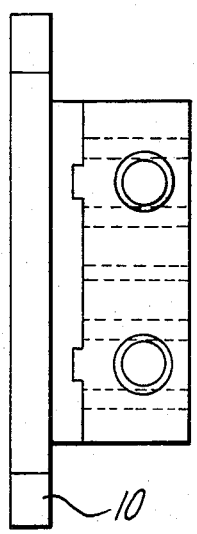
FIG. 4 is a end elevation of the pallet shown in FIG. 2.

Pallet plates 10 have fixed heel locator fixture 18 mounted thereon with alignment recess 19 adapted to engage heel 20 of lasted upper 21, with similar movable block 22 spring loaded by means 23 to align toe 24 of lasted upper for any shoe length, width and style for which the system is designed to accommodate. A similar locator mounting for the bottom-down outsole, with heel attached, of the opposite shoe is provided adjacent the inverted lasted upper.

While not shown, it will be understood that the pallet may be extended to accommodate loading and locating of the other mating lasted shoe upper and opposite sole for transport and location of same to and at STATIONS #2 and #3 where automatic roughing and cement application operations take place.

In cooperation with the fixture for locating heel and toe of a lasted upper, last 27 engages base plate 10 to serve a locating function and firm base for sole pressing operations hereinafter described.

Identification of shoe length, width and style on each pallet is accomplished with fixture flags 28 and 29 set at the loading station, or alternatively by a code plate 30 having a recognized bar code, or read photoelectrically identification system provided with identifying code at the loading station which may be read at the automatic roughing and cement application stations. More sophisticated computer controls based on scheduling rather than pallet carried signals provide another alternative.

Figure 6:
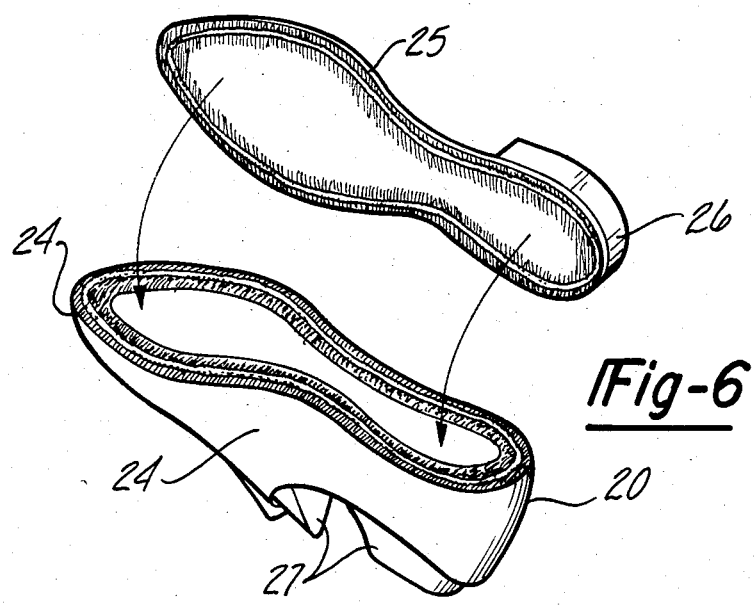
FIG. 6 is a perspective view of a lasted shoe upper prior to application of the sole, and shoe sole with heel attached to be cemented to the lasted upper.

With further reference to FIG. 1, MANUAL STATION #1 is employed for loading sequentially or on a single pallet a pair of lasted uppers with matching soles to be cemented such as illustrated in FIG. 6. Identification of the shoe length, width and style is accomplished as aforementioned at STATION #by the use of fixture flags or code plate identification.

Since the lasted uppers are loaded on the pallets inverted and the outsoles are loaded bottom down in order to accommodate roughing and cement application, opposite soles are located adjacent opposite uppers in order to provide similar paths with regard to the non-symmetrical configuration of the matching surfaces to be cemented.

In the case of roughing of STATION #2, rotary wire brushes are required to rough the surfaces to be cemented by wiping toward the center and a pair of wiping heads programmed to follow identical parallel horizontal closed loop paths can be mounted on a common carrier having X-Y programmable control. The rotational axes of such brushes are horizontal with vertical pivotal mounting programmed to provide inward wiping in passing around roughing paths. Known per se programmable X-Y slide tables and pivotal head mountings such as commercially produced under the trade mark "ACCUMOTION" by Accuratio Systems Inc., of Jefferson, Ind., are adapted to operate at the roughing station upon arrival and location of each pallet receiving shoe identification of the required program to complete the operation.

With reference to STATION #3 for automatic cement application it will be understood, relative to the plan view of the uppers and outsoles of any pair of shoes mounted on the fixtures of a pallet, a path of cement application for a left sole will likewise be the same as an identical displaced path for a right upper, and that symmetrically identical paths will be required for corresponding right sole and left upper. Thus, two dispensing heads on a common carrier moving in unison along programmed X-Y axes will be capable of simultaneously depositing cement as required on both upper and opposite sole for properly matching assembly at a further station. Cement on both upper and sole will be activated by heat as required for adherence. said cement dispensing station includes means for stopping and accurately locating individual pallets at said station in non-synchronous relation to pallets being stopped and located at other of said operation stations.

Figure 5:
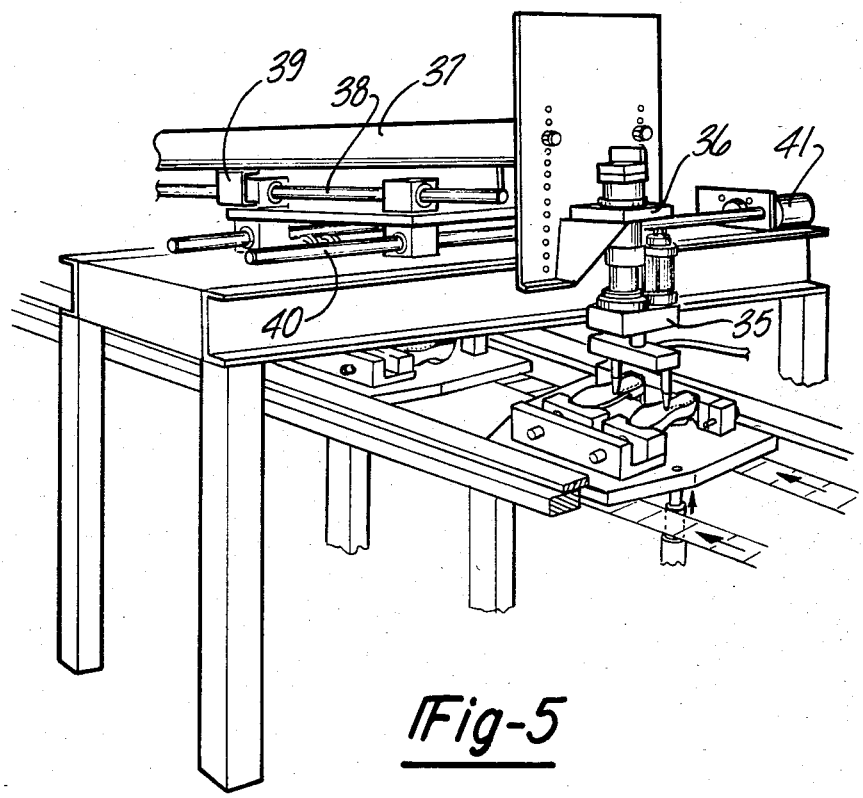
FIG. 5 is a perspective view of a typcial multiple axis table for use at automatic roughing and cementing stations.

With reference to FIG. 5 a suitable multiple axis table which may be adapted to perform the automatic cement dispensing operation for example includes dispensing head 35 mounted on carrier 36 suspended from rail 37 displaced on one axis by rotary screw 38 driven by servo motor 39 and on a perpendicular axis by rotary screw 40 driven by servo motor 41.

With further reference to FIG. 1 MANUAL STATION #4 is provided to load shank and bottom filler on the inverted lasted upper following the cement application operation and MANUAL STATION #5 is provided for off-loading to dry the cement and reloading to proceed to duplicate SEMI-AUTOMATIC STATIONS 6A and 6B where cement on both upper and sole will be activated by heat as required for adherence.

The operator will pick up the cemented outsole, align it with the proper upper and load the spotted sole and upper to a fixture underneath a ram and depress palm buttons. A press having dual rams with pivoted urethane face pad will be manually lowered and automatically raised. The ram will lower pressing the sole onto the upper and hold for five seconds. At completion of the time cycle the ram will retract and the pallet will be discharged to the next operation making way for another empty pallet. In both right and left shoes are mounted on a single pallet, a press will consist of two dual rams each with pivoted urethane face pad. Similar 6A and 6B stations are employed for the sole laying operation in order to accommodate a longer cycle time for such operation.

The function of AUTOMATIC STATION #7 is to scour the heel (even and smooth it with respect to the sole) responding to the different number of heels encountered in the product mix. The particular mechanism for accomplishing this operation, as may be provided by those skilled in the art, is outside of the scope of this invention and not illustrated in detail; however, as an example of a satisfactory approach, typical station equipment will be described in general terms. The station may consist of an overhead sliding table with two pivoting arms each with a brush, one rough and one smooth, mounted rigidly in bearings with their axes vertical and driven by a single electric motor through a timing belt/pulley arrangement. The operation of the station may commence with the location and lifting of the pallet/ fixture and two shoes (assuming a double shoe pallet) into overhead pressure pads which will hold the shoes onto the fixture. This may be accomplished by the automatic stop lifting from below which first locates the pallet accurately with pins which enter the pallet bushings. When the shoes are firmly held into the fixture by the upward motion of the stop, the table may slide to bring the rough brush into contact with the side of the first heel. The brushes may follow the periphery of the heel as the arms rotate. The first brush will pass along one side, around the back and around to the other side of the first heel then move over in a direction parallel to line flow to start on the second heel, at the same time bringing the second heel in contact with the roughed first heel. This horizontal travel may be provided by cylinder actuation of the table. Such process will be completed when the second wheel has finished both heels. The table may then retract the brushes and the locator will lower, bringing the fixture and pallet back to the conveyor for discharge to the next station. The scouring path for a particular style and size may be determined by following the sole side with a roller mounted on the same spring loaded arm as the brush.

The purpose of AUTOMATIC STATION #8 is to deposit ink along the periphery of each heel. Again, the specific mechanism, as may be provided by those skilled in the art, is outside the scope of this invention and therefore is not illustrated in detail. However, as a general example the operation may be accomplished by two wheels mounted with their axes vertical in bearings. They will be kept damp with ink on each off-cycle by rotating the wheels with an ink filled pad on a linear slide. When the pallet, fixture and shoes have arrived in the station and have been located and lifted into an overhead pressure pad, the two wheels may be advanced by the sliding of a table similar to that described for STATION #7 and may traverse and roll on the outside of the heels. The bearing packages may be contained on the end of revolving arms spring loaded to assure an even pressure for inking the outside of the heels and may be guided for a roller bearing on the side of the sole also mounted on the spring loaded arm. Following completion of the inking cycle the pallets will be lowered onto the conveyor on which they will pass to the final station.

I claim:

1. Shoe manufacturing system to cement lasted uppers and outsoles comprising a plurality of sequential operation stations including an automatic cement dispensing station, non-synchronous pallet conveyor system means extending through said stations, a plurality of pallets movable in non-synchronous sequence to and through said stations, means for stopping and accurately locating individual pallets at said cement dispensing station in non-synchronous relation to pallets being stopped and located at other of said operation stations, lasted shoe upper fixture means on each pallet to hold any of a family of lasted shoe uppers of different size and style in a predetermined position on said pallet, identification means for each individual shoe size and style on each individual pallet when located for cement dispensing operation at said cement dispensing station, and programmable cement dispensing means responsive to said identification means selectively movable along different predetermined dispensing paths for different shoe sizes and styles.

2. Manufacturing system of claim 1 including outsole fixture means on each pallet adjacent said lasted shoe upper fixture means.

3. Manufacturing system of claim 2 wherein said respective fixture means are constructed to hold said lasted shoe upper in an inverted position and said outsole in a bottom down position appropriate for dispensing cement on respective upper surfaces to be cemented together.

4. Manufacturing system as set forth in claim 3 wherein said respective fixture means located adjacent lasted shoe upper and outsole of opposite matching shoes to provide adjacent parallel identical unsymmetrical cement application paths.

5. Manufacturing system of claim 4 wherein said programmable cement dispensing means is provided with dual dispensing heads mounted in fixed relation to each other to simultaneously dispense cement along said respective parallel paths on said lasted shoe upper and adjacent opposite outsole.

6. Manufacturing system of claim 1 wherein said fixture means includes a fixed heel locator and means to otherwise locate any of said family of lasted shoe uppers of different size and style.

7. Manufacturing system of claim 6 wherein said last means includes toe engaging slide means.

8. Manufacturing system of claim 7 wherein said fixture means accommodates last supporting engagement with the upper pallet surface to withstand vertical pressure applied in sole cementing operations.

9. Manufacturing system of claim 2 including an automatic roughing station preceding said cement dispensing station where respective surfaces of said lasted shoe upper and outsole to be cemented together are respectively roughened to augment effective cement adherence.

10. Manufacturing system of claim 9 including roughing head means with programmable means for moving in a roughing path around the upper perimeter of said inverted lasted shoe upper corresponding to the path of required cement dispensing.

11. Manufacturing system of claim 1 including a manual load shank and bottom filler station following said automatic cement dispensing station.

12. Manufacturing system of claim 11 including a manual off-load to dry and reload station.

13. Manufacturing system of claim 12, including a semi-automatic activate spot and sole lay station.

14. Manufacturing system of claim 13, including an automatic scour station.

15. Manufacturing system of claim 14, including an automatic ink station.

16. Manufacturing system of claim 1 including a manual load and unload station, an automatic roughing station, an automatic cement dispensing station, a manual load shank and bottom filler station, a manual off-load to dry and reload station, a semi-automatic activate spot and sole lay station, an automatic scour station, and an automatic ink station.

* * * * *